United States Patent
Samdanis et al.

(10) Patent No.: US 10,506,471 B2
(45) Date of Patent: Dec. 10, 2019

(54) NETWORK MANAGEMENT SYSTEM AND METHOD FOR A SHARED RADIO ACCESS NETWORK, RAN, INFRASTRUCTURE

(71) Applicant: NEC EUROPE LTD., Heidelberg (DE)

(72) Inventors: Konstantinos Samdanis, Munich (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 21 days.

(21) Appl. No.: 15/735,218

(22) PCT Filed: Jun. 11, 2015

(86) PCT No.: PCT/EP2015/063018
§ 371 (c)(1),
(2) Date: Dec. 11, 2017

(87) PCT Pub. No.: WO2016/198104
PCT Pub. Date: Dec. 15, 2016

(65) Prior Publication Data
US 2018/0184331 A1    Jun. 28, 2018

(51) Int. Cl.
*H04W 28/16*   (2009.01)
*H04W 72/04*   (2009.01)

(52) U.S. Cl.
CPC .......... *H04W 28/16* (2013.01); *H04W 72/04* (2013.01)

(58) Field of Classification Search
None
See application file for complete search history.

(56) References Cited

U.S. PATENT DOCUMENTS

| | | |
|---|---|---|
| 2012/0026961 A1 | 2/2012 | Pittmann et al. |
| 2013/0176975 A1 | 7/2013 | Turanyi et al. |
| 2013/0267229 A1 | 10/2013 | Gopalakrishnan |
| 2013/0303114 A1 | 11/2013 | Ahmad et al. |
| 2015/0003413 A1 | 1/2015 | McKibben et al. |
| 2017/0250750 A1* | 8/2017 | Franchi .............. H04B 7/18506 |

FOREIGN PATENT DOCUMENTS

| | | |
|---|---|---|
| WO | WO 2014060424 A2 | 4/2014 |
| WO | WO 2015070909 A1 | 5/2015 |

OTHER PUBLICATIONS

3GPP TR 23.708 V13.0.0 (Jun. 2015); $3^{rd}$ Generation Partnership Project; Technical Specification Group Services and System Aspects; Architecture enhancements for service capability exposure (Release 13), Jun. 2015, pp. 1-31.

(Continued)

*Primary Examiner* — Diane L Lo
(74) *Attorney, Agent, or Firm* — Leydig, Voit & Mayer Ltd.

(57) ABSTRACT

A network management system for a shared Radio Access Network (RAN) infrastructure provided by a mobile network operator includes a master operator network manager of the mobile network operator for managing the shared RAN infrastructure; one or more tenants configured to receive resource allocations from the master operator network manager; and a capacity or resource broker configured to decide on the resource allocations to the one or more tenants, wherein the capacity or resource broker resides inside the network of the mobile network operator.

20 Claims, 5 Drawing Sheets

(56) References Cited

OTHER PUBLICATIONS

3GPP TS 32.130 V14.0.0 (Dec. 2016); $3^{rd}$ Generation Partnership Project; Technical Specification Group Services and System Aspects; Telecommunication management; Network sharing; Concepts and requirements (Release 14), Dec. 2016, pp. 1-17.
3GPP TR 22.852 V13.1.0 (Sep. 2014); $3^{rd}$ Generation Partnership Project; Technical Specification Group Services and System Aspects; Study on Radio Access Network (RAN) sharing enhancements (Release 13), Sep. 2014, pp. 1-34.
3GPP TS 23.251 V13.2.0 (Jun. 2016); $3^{rd}$ Generation Partnership Project; Technical Specification Group Services and System Aspects; Network Sharing; Architecture and functional description (Release 13), Jun. 2016, pp. 1-39.

\* cited by examiner

NETWORK MANAGEMENT SYSTEM AND METHOD FOR A SHARED RADIO ACCESS NETWORK, RAN, INFRASTRUCTURE

CROSS REFERENCE TO RELATED APPLICATIONS

This application is a U.S. National Phase application under 35 U.S.C. § 371 of International Application No. PCT/EP2015/063018, filed on Jun. 11, 2015. The international application was published in English on Dec. 15, 2016, as WO 2016/198104 A1 under PCT Article 21(2).

FIELD

The present invention generally relates to a network management system for a shared Radio Access Network, RAN, infrastructure provided by a mobile network operator. Furthermore, the present invention relates to a method of performing network management for a shared Radio Access Network, RAN, infrastructure provided by a mobile network operator.

BACKGROUND

As mobile network operators are facing a tremendous traffic increase, not corresponding to the associated revenue, they are in an urgent need to reduce Capital Expenditure (CAPEX) and Operating Expenditure (OPEX) costs. Infrastructure sharing is a means to reduce network deployment and operation costs provided that such an activity can reflect accurately mobile operator's service demands. The first generation of network sharing solutions concentrated on passive and active sharing based-on fixed, i.e. long term, contractual agreements among mobile network operators and virtual mobile operators or third parties, which are commonly referred to as tenants. Third Generation Partnership Project (3GPP) has already specified two architectures for enabling network sharing (for reference, see 3GPP TS 23.251, Network Sharing; Architecture and Functional Description, Rel. 12, June 2014). One referred to as Multi-Operator Core Network (MOCN), where each operator is sharing base stations known as evolved Node Bs (eNBs) in 3GPP terminology, connected to the core network elements of each mobile network operator using a separate S1 interface. In the second one named Gateway Core Network (GWCN) operators share additionally the Mobility Management Entity (MME).

A method that defines how a mobile operator can identify a shared network infrastructure, and selectively allow users to handover considering the scenarios of offloading, coverage extension and virtual mobile operator is presented in US 2013/0267229 A1, concentrating on the Radio Access Network (RAN). Such a method is based on Public Land Mobile Network (PLMN) id or partner id, while handover mechanisms are specified considering both MOCN and GWCN architectures. A complementary method that identifies core network traffic related to different virtual operators ensuring isolation and provision of the appropriate Quality of Service (QoS) in the Evolved Packet Core (EPC) is introduced in US 2013/0176975 A1.

However, these solutions are not meant to be dynamic, neither flexible considering short terms resource allocation request, i.e. in the scale of hours, minutes or even seconds. Recent solutions focus on more dynamic, on-demand mechanisms that require no-human intervention, i.e. signaling-based, which can re-configure resources among different tenants within hours, a few minutes or even seconds. A set of such solutions introduce the network entity of capacity or resource broker, a centralized logical or physical entity that resides inside a mobile operator network or within a third party infrastructure and facilitates network sharing. In particular, the capacity or resource broker is responsible for receiving service requests from virtual mobile network operators or application providers or third parties, assess such requests based-on the global network resource view and Service Level Agreements (SLAs), allocate network resources and network policies to accommodate the placed requests and support the related charging procedures.

The notion of capacity or resource broker is also introduced in 3GPP with a high level business use case presented in, which facilitates on-demand resource allocation in where a host RAN provider, i.e. infrastructure provider, can share via automated means an indicated portion of capacity for a particular time period with a virtual mobile network operator (for reference, see 3GPP TR 22.852, Study on Radio Access Network (RAN) Sharing enhancements, Rel. 13, September 2014). Such a use case leaves open how the capacity or resource broker is integrated on the current 3GPP RAN architecture, considering the network interfaces needed and towards which Evolved Packet System (EPS) elements, while it also does not detail the related operations.

SUMMARY

In an embodiment, the present invention provides a network management system for a shared Radio Access Network (RAN) infrastructure provided by a mobile network operator. The system includes a master operator network manager of the mobile network operator for managing the shared RAN infrastructure; one or more tenants configured to receive resource allocations from the master operator network manager; and a capacity or resource broker configured to decide on the resource allocations to the one or more tenants, wherein the capacity or resource broker resides inside the network of the mobile network operator.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide network management systems for a shared Radio Access Network, RAN, infrastructure and a method of performing network management for a shared RAN infrastructure in such a way that multi-tenancy support is achieved that enables on-demand resource allocation towards different tenants in a dynamic fashion.

In accordance with an embodiment of the invention, a network management system is provided for a shared Radio Access Network, RAN, infrastructure provided by a mobile network operator, comprising a master operator network manager of said mobile network operator for managing said shared RAN infrastructure, one or more tenants configured to receive resource allocations from said master operator network manager, and a capacity or resource broker that is configured to decide on said resource allocations to said one or more tenants, wherein said capacity or resource broker resides inside the network of said mobile network operator.

Furthermore, in accordance with an embodiment of the invention, a method is provided for performing network management for a shared Radio Access Network, RAN, infrastructure provided by a mobile network operator, comprising: managing said shared RAN infrastructure by means of a master operator network manager of said mobile network operator, one or more tenants receiving resource allocations from said master operator network manager, and deciding on said resource allocations to said one or more tenants by means of a capacity or resource broker that resides inside the network of said mobile network operator.

Multi-tenancy support enabling an on-demand dynamic resource allocation towards different tenants including mobile virtual network operators (MVNOs) and third parties can be achieved by enhancing the existing 3GPP network management architecture by placing a capacity or resource broker, i.e. an entity responsible for resource allocation inside a network of the mobile network master operator. Specifically, embodiments of the invention focus on integrating the capacity or resource broker in a current 3GPP Long Term Evolution (LTE) architecture as described in 3GPP TS 32.130 "Telecommunication management; Network Sharing; Concepts and requirements", Rel. 12, December 2014, where the master operator network manager, i.e. the network management entity of the operator that provides the network infrastructure, offers network sharing capabilities to mobile virtual network operators, referred to as sharing operators in 3GPP terminology, for certain regions of the radio access and core network considering both MOCN and GWCN scenarios. Consequently, embodiments of the present invention can be suitably applied in dynamic RAN sharing scenarios which are assumed to be widely employed in future mobile networks.

According to embodiments of the invention, the capacity or resource broker may be designed as an entity that is responsible for resource, capacity, bandwidth and/or QoS allocations to different tenants and that may also be configured to facilitate admission control and Service Level Agreement (SLA) negotiations with MVNOs and/or service providers. The capacity or resource broker may be configured to receive, via the master operator network manager, service requests from the MVNOs or application providers or third parties, assess such requests based-on the global network resource view and Service Level Agreements (SLAs), allocate network resources and network policies to accommodate the placed requests and support the related charging procedures.

According to embodiments of the invention the capacity or resource broker may be placed at or may be implemented as part of the network management system of the infrastructure provider. Specifically, in case of a 3GPP network architecture, the capacity or resource broker may be placed at or may be implemented as part of the master operator network manager, i.e. the network management entity of the operator that provides the network infrastructure.

According to embodiments of the invention, a logical implementation of the capacity or resource broker may be realized, which may consist of a number of EPCs (Evolved Packet Cores) and network management entities. In this way, an introduction of the capacity or resource broker as a stand alone network entity requiring connectivity, i.e. a number of newly defined interfaces, towards the remaining of the 3GPP network, can be avoided. Specifically, according to embodiments of the invention the capacity or resource broker may be implemented as a logically centralized network function that is composed by functions that reside on the master operator network manager, on the master operator shared RAN domain manager, on shared network elements of said shared RAN infrastructure, on the PCRF and/or on the MME.

According to embodiments of the invention, the master operator network manager may be implemented as an Integration Reference Point, IRP, manager that is configured to monitor and control shared network elements of the shared RAN infrastructure via an IRP agent that resides in the master operator shared RAN domain manager or network element managers of the shared network elements.

According to embodiments of the invention, the master operator network manager may be configured to enable sharing operator network managers of tenants, i.e. the network management system of a mobile virtual network operator, for instance, to monitor and control the respective allocated resources in isolation, for instance by introducing a PLMN id into the corresponding monitoring data.

According to embodiments of the invention, the capacity or resource broker may be configured to use (existing) network monitoring information that is collected at the master operator network manager for taking resource allocation decisions.

According to embodiments of the invention, the tenants may include mobile virtual network operators (MVNOs) comprising a sharing operator network manager that is configured to receive resource allocations from the master operator network manager. In this regard, it is noted that a Type 5 Interface between the master operator network manager and the sharing operator network manager, comprising enhancements that will be explained in detail below, can be used to provide resource and performance monitoring information towards MVNOs.

According to embodiments of the invention, the tenants may include third parties in a 3GPP architecture, i.e. service and/or application providers, like over-the-top content, OTT, application providers. In this regard it may be provided that a Service Capability Exposure Function (SCEF) that is placed in the network management system of the infrastructure provider, i.e. in case of 3GPP at the master operator network manager, is configured to use the capacity or resource broker for resource/capacity and/or SLA provisions/allocations/to the application providers. By positioning the SCEF at the master operator network manager, the SCEF is not only exposing information for devices, e.g. MTC devices as in the case of OMA API, but can also use the capacity broker and the master operator network manager direct and indirect interfaces, i.e. Inf-N and Inf-B, to control SLAs and allocate resources.

According to embodiments of the invention, the tenants may direct resource requests on-demand to the master operator network manager. These resource requests may be configured to contain at least one of an OTT application id, a service provider id, an OTT session id, a PLMN id, a specification of the requested resource allocation (e.g. resource blocks), the type of the request (e.g. periodic, on-demand), a time duration, resource type and/or QoS (e.g. radio bearer types). Additionally or alternatively, the resource requests may be configured to contain mobility related information (e.g. considering stationary users and average mobility speed, for instance with the grades low, medium and high), a mobility area and/or Tracking Area. Furthermore, the resource requests may be configured to additionally contain parameters for assisting traffic patterns predictability, e.g. keep alive messages in relation with particular applications, connection properties (high, medium, low throughput) and/or expected QoS considering the tolerance risk of resource starvation.

According to embodiments of the invention, a set of different interface enhancements is introduced, considering the Inf-N, Inf-B, Type 5 interface and/or Application API in order to provide information regarding different tenants, the affected cells, type of requests, timing aspects and/or QoS, and to enable the interface to accommodate information contained in the respective resource requests. The embodiments regarding the different interfaces are as follows:

The existing 3GPP Int-N interface may be extended to accommodate information regarding the following but not exclusive list including the OTT application or OTT session id or service provider id or PLMN id, list of cells, and per cell or set of cells resource allocation (e.g. resource blocks) and type of request (periodic, on-demand), resource type, time duration, QoS (e.g. radio and/or core network bearer types) and update information about offloading policies and mobility considering stationary users and average mobility speed (low, medium, high) as well as the mobility area or Tracking Area (TA). Additionally or alternatively, the existing 3GPP Int-N interface may be configured to support resource and performance monitoring per OTT application or OTT session id or service provider id or PLMN-id or MVNO identifier either per eNB or aggregated considering a set of eNBs. To accomplish this, an OTT application provider or session identifier, the PLMN-id or some other related identifier may be introduced inside the monitoring packets related to a particular MVNO.

The existing 3GPP Int-B interface may be extended to accommodate information regarding the following but not exclusive list including the OTT application id or service provider id or OTT session id or PLMN id, resource allocation (e.g. resource blocks), type of request (periodic, on-demand), time duration, resource type and QoS (e.g. radio bearer types). According to embodiments, the existing 3GPP Int-B interface may also reflect mobility considering e.g. stationary users and average mobility speed (e.g. low, medium, high). Additionally or alternatively, the existing 3GPP Int-B interface may be configured to support resource and performance monitoring per OTT application id or service provider id or OTT session id or PLMN-id or MVNO identifier. To accomplish this, the PLMN-id or some other related OTT application provider or session identifier may be introduced inside the monitoring packets related to a particular MVNO.

The existing 3GPP Type 5 interface may be extended to accommodate dynamic resource requests from MVNOs, which contain the following but not exclusive list of information including the PLMN id, list of cells (including potential cells due to user mobility profile), the resource allocation (e.g. resource blocks, throughput) and type of request (periodic, on-demand), resource type, time duration. Additionally or alternatively, this interface may be configured to support resource and performance monitoring per PLMN-id or MVNO identifier, either per eNB or aggregated considering a set of eNBs. To accomplish this, the PLMD-id or some other related identifier may be introduced inside the monitoring packets related to a particular MVNO and to distinct monitoring and performance information towards particular MVNOs.

The application API may be extended to accommodate on demand resource or SLA provision considering the following but not exclusive list of information including the OTT id or OTT session id, list of cells (including potential cells due to user mobility profile), the resource allocation (e.g. resource blocks, throughput) and type of request (periodic, on-demand), resource type, time duration.

Embodiments of the invention described hereinafter integrate a capacity or resource broker in a 3GPP architecture where the broker resides inside the network of the mobile network operator responsible for allocating resources to virtual operators. In contrast to prior art solution, these embodiments strictly follow the 3GPP network management architecture described in 3GPP TS 32.130 "Telecommunication management; Network Sharing; Concepts and requirements", Rel. 12, December 2014. Furthermore, these embodiments do not require the introduction of new interfaces, but specific extensions to existing ones to support multi-tenancy using the already existing 3GPP network management architecture. In addition, the embodiments consider interfaces extensions that facilitate Over-The-Top (OTT) Application providers and services to acquire network resources from the capacity broker, building on the top of the Service Capability Exposure Function (SCEF) described in 3GPP TR 23.708 "Architecture enhancements for service capability exposure", Rel. 13, December 2014, providing extensions on the Application Programming Interface (API) considered in 3GPP, e.g. on the existing interfaces defined at OMA/GSMA, as will be described in detail below.

Figure 1:
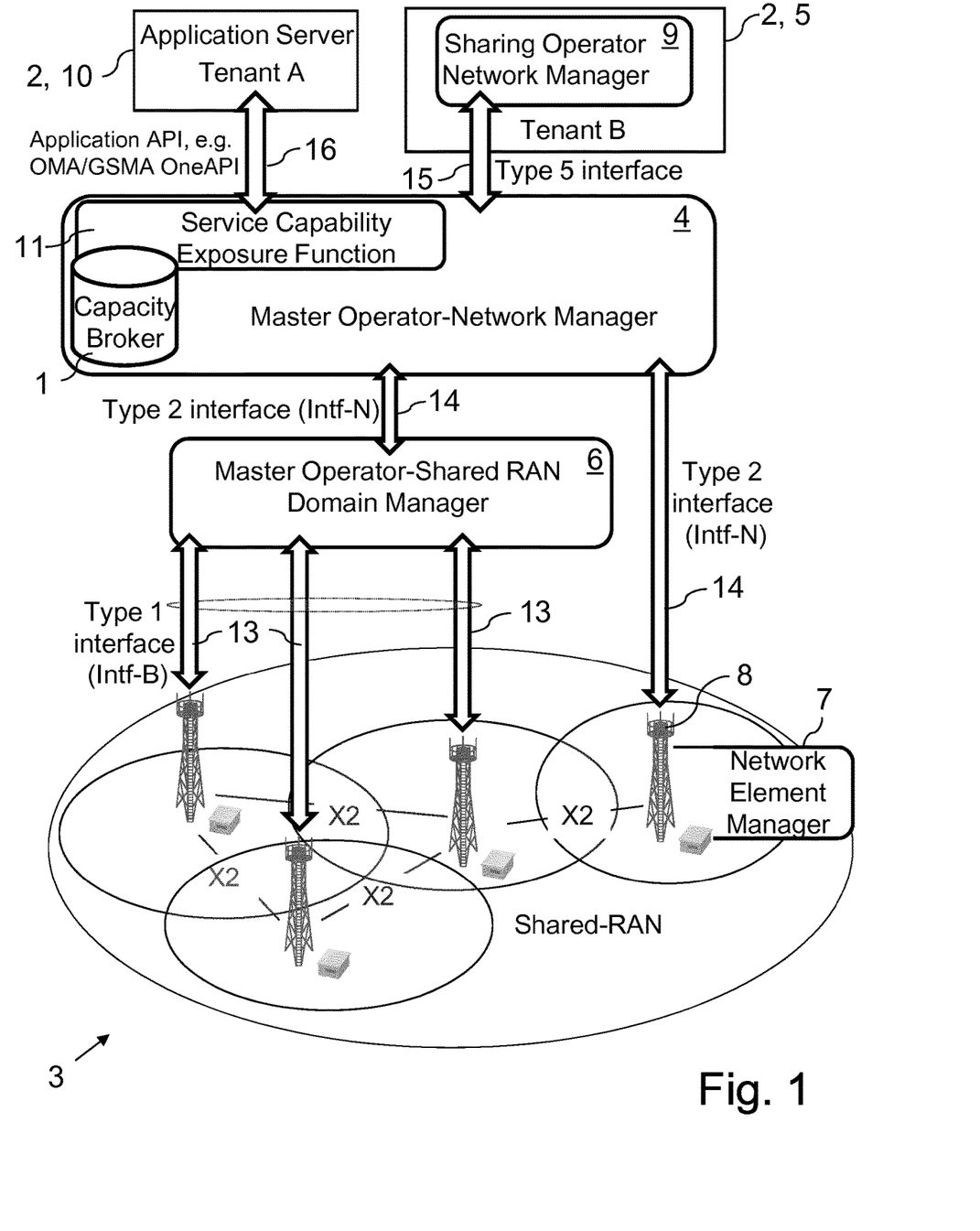
FIG. 1 is a schematic view illustrating a network management architecture accommodating a capacity broker in an MOCN scenario in accordance with an embodiment of the present invention.

FIG. 1 is a schematic view illustrating a network management architecture accommodating a capacity or resource broker 1 in an MOCN (Multiple Operator Core Network) scenario in accordance with a first embodiment of the present invention. The capacity or resource broker 1 is integrated in the network management architecture to facilitate network sharing among multiple tenants 2 in a mobile network or, more specifically, in a shared RAN 3. While the present invention can be applied in connection with various network management architectures, in the illustrated embodiment the focus is on the 3GPP Long Term Evolution (LTE), considering the network management architecture described in 3GPP TS 32.130, "Telecommunication management; Network Sharing; Concepts and requirements", Rel. 12, December 2014, which is incorporated herein by way of reference.

According to this architecture the master operator network manager 4, i.e. the network management entity of the operator that provides the infrastructure of the mobile network 3, offers network sharing capabilities for certain regions of the radio access network to different tenants 2 including mobile virtual network operators 5, referred to as sharing operators in 3GPP terminology, and to third parties. In the 3GPP network management architecture for enabling network sharing the master operator network manager 4 is defined as the Integration Reference Point (IRP) manager that monitors and controls the shared network elements via the IRP agent, which either resides in the master operator shared RAN domain manager 6 or in a network element manager 7 of a shared eNB 8. The master operator network manager 4 in turn enables the sharing operator network manager 9, i.e. the network management system of the mobile virtual network operator 5, to monitor and control the corresponding allocated resources.

As shown in FIG. 1, in accordance with an embodiment of the invention the capacity or resource broker 1 is placed at or is a part of the master operator network manager 4 to facilitate admission control and Service Level Agreement (SLA) negotiation with MVNOs 5 and third parties, e.g. with application servers 10 of OTT providers. The capacity or resource broker 1 can use the existing network monitoring information that is collected at the master operator network manager 4 in order to take a decision on resource allocation. Further, the capacity or resource broker 1 can use the existing interfaces, amended as described below to control and allocate resources accordingly.

In addition, the provision of resources and SLA for OTT application providers 10 can be achieved by positioning the Service Capability Exposure Function (SCEF) 11 at the master operator network manager 4. In this way the SCEF 11 is not only exposing information for devices, e.g. MTC devices, as in the case of OMA API, but can also use the capacity or resource broker's 1 and the master operator network manager's 4 direct and indirect interfaces, i.e. Inf-N and Inf-B, to control SLAs and allocate resources.

Figure 2:
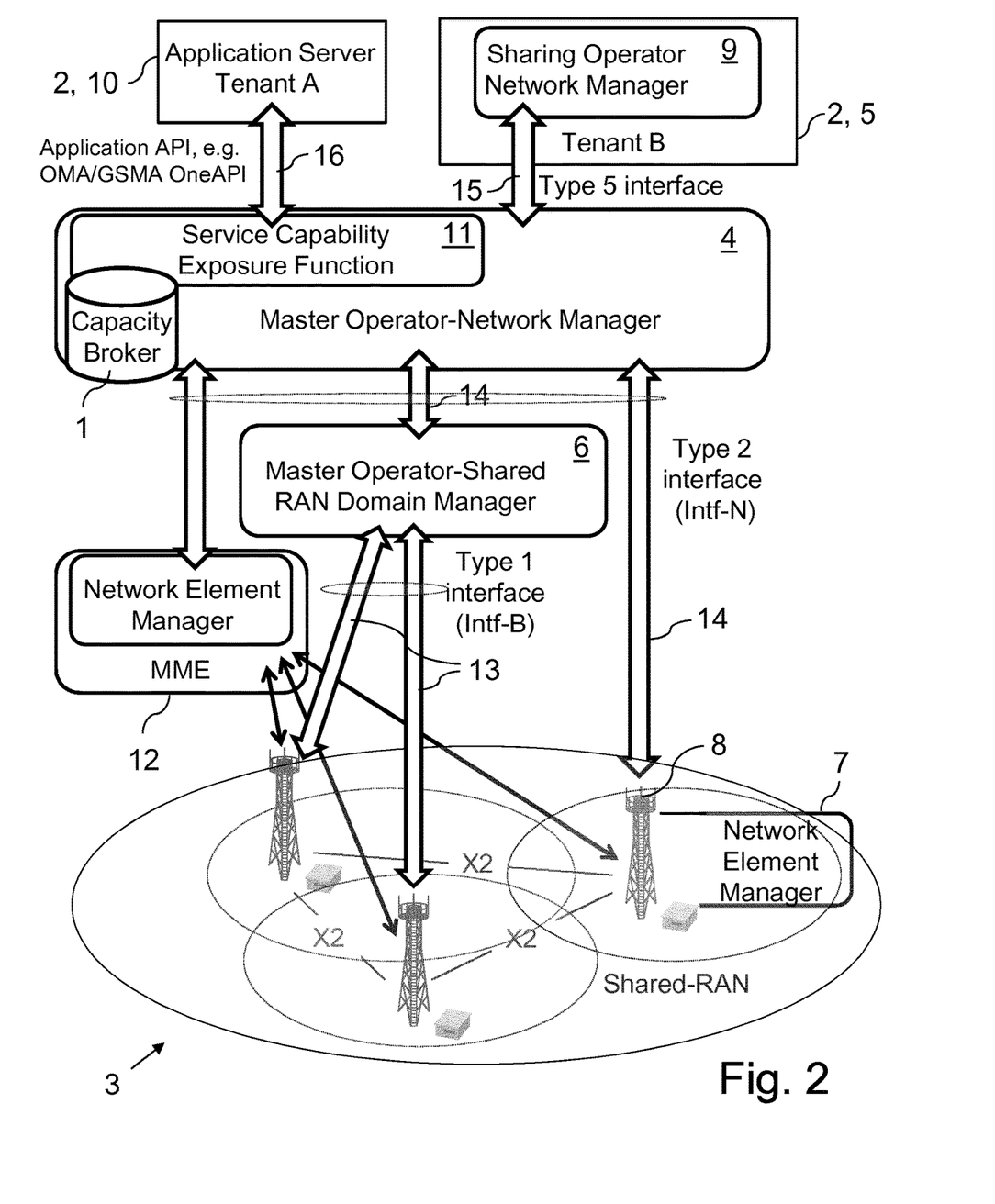
FIG. 2 is a schematic view illustrating a network management architecture accommodating a capacity broker in a GWCN scenario in accordance with an embodiment of the present invention.

FIG. 2 is a schematic view illustrating a network management architecture accommodating a capacity or resource broker in a GWCN (Gateway Core Network) scenario in accordance with an embodiment of the present invention. In FIG. 2, which is similar to FIG. 1, like reference numerals denote like components as in FIG. 1. In contrast to the MOCN scenario illustrated in FIG. 1, the Mobility Management Entity (MME) 12 is additionally involved in the GWCN scenario and shared between tenants 2.

In the illustrated embodiment, both in the MOCN scenario and in the GWCN scenario, resource requests placed by a MVNO 5 or an OTT/service provider 10, are designed to contain the respective OTT application id, the service provider id, the OTT session id and/or PLMN id. Moreover, the resource requests may contain information on resource allocations (e.g. in form of specifying certain resource blocks), on the type of the resource request (e.g. whether it is periodic or on-demand), on the time duration (for which the resources shall be allocated), on the resource type and/or on the required/desired QoS (e.g. by specifying radio bearer types). In addition, it may be provided that the resource requests also reflect mobility, i.e. considering whether stationary users are concerned or, in case of moving users, considering an average mobility speed (e.g. low, medium, high), and/or considering a mobility area or Tracking Area. Still further, the resource requests may contain additional parameters for assisting traffic patterns predictability, e.g. keep alive messages in relation with particular applications, information on connection properties (e.g. high, medium, low throughput) as well as information on expected QoS considering the tolerance risk of resource starvation. It should be noted that any combination of the above mentioned information items may be included in a resource request. Furthermore, as will be easily appreciated by those skilled in the art, it should be noted the above list is not exclusive and that alternative or additional information items, which are not explicitly mentioned above, may be contained within the resource requests.

Generally, a resource request may be performed when a MVNO 5 needs more resources, capacity and/or QoS for a particular service or in relation with an event or occasion, where the amount of network usage is expected to be high, or simply in case of congestion, or for specific type of users or applications that require a premium service. Furthermore, a resource request can also be placed by OTT and service providers 10 on a per application basis, i.e. when a user requests a particular application, e.g. high definition television streaming, or on a per token basis, i.e. when a user signals that he/she needs more resources, or per subscription profile.

The embodiments of the invention described above take advantage of the standardized interfaces, wherein enhancements per interface may be implemented basically in order to comply with the resource requests as described above. Specifically, these enhancements may be implemented as follows:

Type 1 interface Inf-B: The interface Inf-B 13 is the interface between the master operator-shared RAN domain manager 6 and the eNBs 8. According to embodiments of the invention this interface 13 is extended to accommodate information regarding the respective OTT application id and/or service provider id and/or OTT session id and/or PLMN id. Moreover, the interface Inf-B 13 may be extended to accommodate information on resource allocations (e.g. resource blocks), on the type of request (e.g., periodic, on-demand), on the time duration, the resource type and QoS (e.g. radio bearer types). In addition, the interface Inf-B 13 enhancement may also reflect user mobility and aggregate or group user mobility, considering e.g. stationary users and average mobility speed (e.g. low, medium, high). In addition, the interface Inf-B 13 may be adapted to support resource and performance monitoring per OTT application id or service provider id or OTT session id or PLMN id or MVNO 5 identifier. To accomplish this, the PLMN id or some other related OTT application provider identifier or session identifier may be introduced inside the monitoring packets related to a particular MVNO 5. Again, it should be noted that any combination of the above mentioned enhancements may be implemented by Inf-B 13. Furthermore, as will be easily appreciated by those skilled in the art, it should be noted the above list is not exclusive and that alternative or additional enhancements, which are not explicitly mentioned above, may be implemented.

Type 2 interface Inf-N: The interface Inf-N 14 is the interface between the master operator network manager 4 and the master operator-shared RAN domain manager 6 or network element manager 7 at the eNB 8. According to embodiments of the invention the Inf-N interface 14 may be extended to accommodate information regarding the OTT application or OTT session id or service provider id or PLMN id. Moreover, interface Inf-N 14 may be extended to accommodate information on the respective cells that are affected by a resource request (e.g. in form of a list of cells) and/or per cell or per a set of cells the resource allocation (e.g. resource blocks) and type of request (periodic, on-demand), resource type, time duration, QoS (e.g. radio and/or core network bearer types) and/or update information about offloading policies. In addition, the interface Inf-N 14 enhancement may also reflect user mobility and aggregate or group user mobility per cell or set of cells, considering e.g. stationary users and average mobility speed (e.g. low, medium, high) as well as the mobility area or Tracking Area (TA). Furthermore, this interface 14 may be configured to support resource and performance monitoring per OTT application or OTT session id or service provider id or PLMN-id or MVNO 5 identifier, either per each individual eNB 8 or aggregated considering a set of eNBs 8. To accomplish this, the OTT application provider or session identifier PLMN-id or some other related identifier may be introduced inside the monitoring packets related to a particular MVNO 5. Again, it should be noted that any combination of the above mentioned enhancements may be implemented for interface Inf-N 14. Furthermore, as will be easily appreciated by those skilled in the art, it should be noted the above list is not exclusive and that alternative or additional enhancements, which are not explicitly mentioned above, may be implemented.

Type 5 interface: The Type 5 interface 15 is the interface between the master operator network manager 4 and the sharing operator network manager 9 of an MVNO 5. This interface is typically used to provide roaming services across a number of PLMNs. In the network sharing scenario it is used for providing resource and performance monitoring information towards MVNOs 5 assuming a static resource allocation per MVNO 5. Currently, this interface is established typically upon an agreement between mobile operators. According to embodiments of the present invention this interface 15 is extended as described below to accommodate dynamic resource requests from MVNOs 5. For instance, such dynamic resource requests may contain the following but not exclusive list of information including the PLMN id, list of cells (including potential cells due to user mobility profile), the resource allocation (e.g. resource blocks, throughput) and type of request (periodic, on-demand), resource type, time duration. In addition, this interface 15 may be configured to support resource and performance monitoring per PLMN-id or MVNO 5, identifier either per eNB 8 or aggregated considering a set of eNBs 8. To accomplish this, the PLMN-id or some other related identifier may be introduced inside the monitoring packets related to a particular MVNO 5 and to distinct monitoring and performance information towards particular MVNOs 5. Again, it should be noted that any combination of the above mentioned enhancements may be implemented for Type 5 interface 15. Furthermore, as will be easily appreciated by those skilled in the art, it should be noted the above list is not exclusive and that alternative or additional enhancements, which are not explicitly mentioned above, may be implemented.

Application API: The Application API 16 is the interface between an application server 10 and the SCEF 11. The specifics of this interface are currently open under discussion in 3GPP (see, for reference 3GPP TR 23.708, "Architecture enhancements for service capability exposure", Rel. 13, December 2014), which is also willing to adopt APIs from other standardization bodies, e.g. OMA for MTC and GSMA Open API for OTT Application providers. This interface 16 provides access and control to OTT application providers focusing on device management. According to embodiments of the present invention this interface 16 is extended to accommodate on demand resource or SLA provisions, considering the following but not exclusive list of information including the OTT id or OTT session id, list of cells (including potential cells due to user mobility profiles), the resource allocation (e.g. resource blocks, throughput) and type of request (periodic, on-demand), resource type, time duration. Again, it should be noted that any combination of the above mentioned enhancements may be implemented for the Application API 16. Furthermore, as will be easily appreciated by those skilled in the art, it should be noted the above list is not exclusive and that alternative or additional enhancements, which are not explicitly mentioned above, may be implemented.

Existing 3GPP mechanisms provide monitoring information among network manager entities, which were typically used within the same operator. Hence, all monitoring information is shared among network management systems. This simple approach is currently followed in network sharing scenarios assuming that all participating MVNOs share the entire set of resources following a resource pooling paradigm. Although the option of propagating monitoring and performance information per MVNO only with respect to the isolated resources allocated is considered in 3GPP management study (for reference, see 3GPP TS 32.130, "Telecommunication management; Network Sharing; Concepts and requirements", Rel. 12, December 2014), the current mechanisms cannot support it, requiring extension to the management architecture included in 3GPP TS 32.301, "Telecommunication management; Principles and high level requirements", Rel. 12, September 2014. Monitoring applies mostly in the case of MVNO and not so much about OTT application providers, unless OTTs application providers possess an OAM system that needs to regulate or policy police the allocated resource.

According to the embodiments of the present invention, enhancements are introduced to support monitoring per MVNO's 5 or OTT application provider's 10 utilized portion of resources or resource slice, with the monitoring information being distributed only to the corresponding operator 5 or OTT application provider 10. This can be achieved by introducing a PLMN id or a MVNO identifier or a service id or OTT id or OTT session id, either on each measurement report or on an aggregate measurement report propagated from a network management element 7 residing at an eNB 8 and/or from the master operator shared RAN domain manager 6 towards the master operator network manager 4. Alternatively, this can be provided by a User Equipment (UE) directly indicating the PLMN id or a MVNO identifier or a service id or OTT id or OTT session id. The master operator network manager 4 can divide such data and then propagate towards the corresponding MVNO 5 or OTT application provider 10. MVNOs 5 and OTT application providers 10 can then monitor and control the resources that correspond to their share via the sharing operator network manager 9, i.e. the management entity of participating operators, which can receive network management information, e.g. performance, alarms.

According to one embodiment the capacity or resource broker 1 is a physically centralized function being located at the master operator network manager 4. This functional location comes along with the benefit of using the conventional monitoring network information, e.g. UL/DL load, performance measurements, energy saving, alarms, etc. to provide intelligence for multi-tenancy support, and of using the network planning information, e.g. topology, network design, etc. from the Operations Support Systems/Business Support Systems (OSS/BSS). Consequently, in this embodiment the capacity or resource broker 1 can introduce a finer control on a triggering mechanism related to multi-tenancy support at the master operator network manager 4 to retrieve performance and traffic load information from selected RAN regions on-demand at critical instances. The notion of 'critical' can be defined with respect to a-selected RAN regions, which can be realized by a significant change on load or performance, e.g. a significant increase of traffic load, high load variations, frequency of receiving requests for a particular area, the handover ratio towards or within a particular RAN region, high variability reports of the radio conditions, etc.

Figure 3:
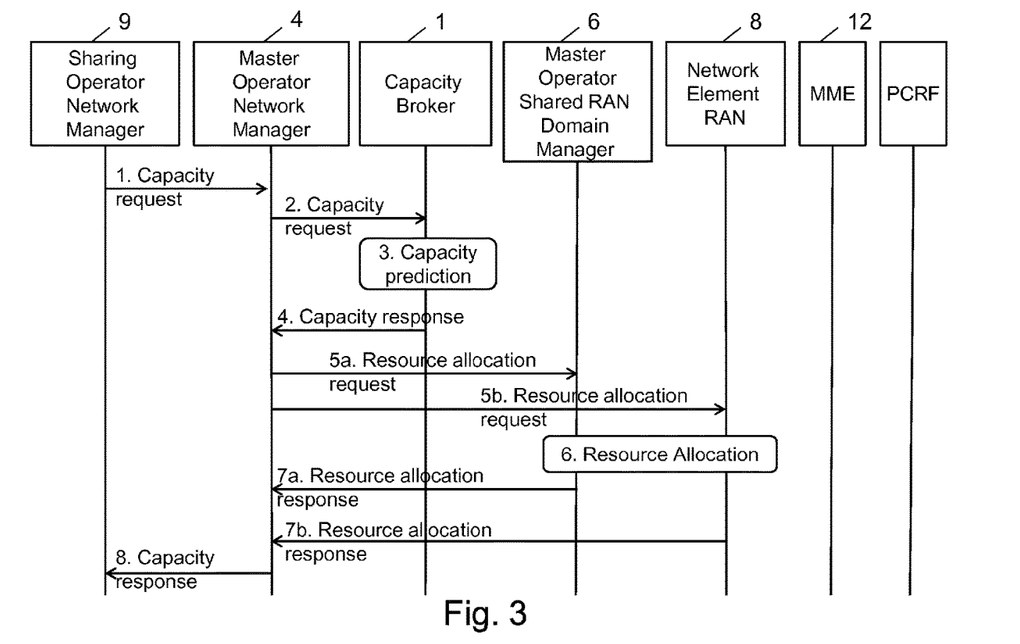
FIG. 3 is a flow diagram illustrating resource allocation and policy provision upon incoming resource requests from an MVNO in accordance with an embodiment of the present invention.

FIG. 3 illustrates a call flow in an infrastructure as shown in FIG. 1 or 2 that describes the steps for allocating resources, capacity and policies in accordance with an embodiment of the present invention, once a new capacity or resource request from an MVNO 5 is received at the master operator network manager 4, as shown in step 1. The master operator network manager 4 forwards the capacity or resource request to the capacity or resource broker 1 in step 2, which checks the sharing configuration and allocates capacity or resource if that is possible in step 3, returning back to the master operator network manager 4 the required resource allocation or virtual slice. In addition, the capacity or resource broker 1 may also return back to the master operator network manager 4 certain specifics regarding the allocated resources, for instance with respect to the starting time and duration, the probability/confidence degree of resource utilization and/or the SLAs including data offloading towards specific eNBs 8 and the corresponding policies for the core network in step 4. Once this information is available, the master operator network manager 4 forwards this information via the Inf-N 14 towards the master operator shared RAN domain manager 6 or to network elements 8 of the shared RAN 3 in step 5a and step 5b, respectively, which allocate the corresponding resources in step 6 and provide back a resource allocation response in step 7a and step 7b, respectively.

When the master-operator network manager 4 receives the resource allocation response from the RAN, i.e. either from the master operator shared RAN domain manager 6 or from a network element 8 of the shared RAN 3, it then replies to the requesting sharing operator network manager 9 in step 8. If the request was successful, the master-operator network manager 4 may indicate within its capacity or resource response the time duration and/or regularity of the resource allocation, the probability/confidence degree of resource utilization and/or, as the case may be depending on the specific configuration, any similar information items related to the resource allocation. If, following step 4, the master operator network manager 4 receives a negative capacity or resource response from the capacity or resource broker 1, it can immediately skip all remaining configuration steps and get to step 8 immediately, creating a capacity or resource response that suggests, e.g., an SLA modification, a reduction of the required time duration, a change of the starting time, and/or a reduction of the number of cells that are available for accommodating the request. Based-on such a feedback the sharing operator network manager 9 can then issue a new modified request, or it can simply terminate the capacity request process towards that particular infrastructure provider. In addition, the Inf-N 14 can coordinate the decisions of the capacity or resource broker 1 with the PCRF (Policy and Charging Rules Function, not shown in FIGS. 1 and 2) in order to enforce policies in the EPS regarding particular OTT applications or services or resource allocations towards MVNOs 5.

As mentioned earlier, in order to facilitate on-demand resource provision for OTT application and service providers, according to embodiments of the invention the Service Capability Exposure Function (SCEF) 11 may be integrated within the master operator network manager 4. This service capability exposure function 4 can provide authentication, authorization and discovery means to external entities, whilst it can take, once integrated within the master-operator network manager 4, advantage of the capacity or resource broker's 1 global network view, which can be used for resource abstraction.

Figure 4:
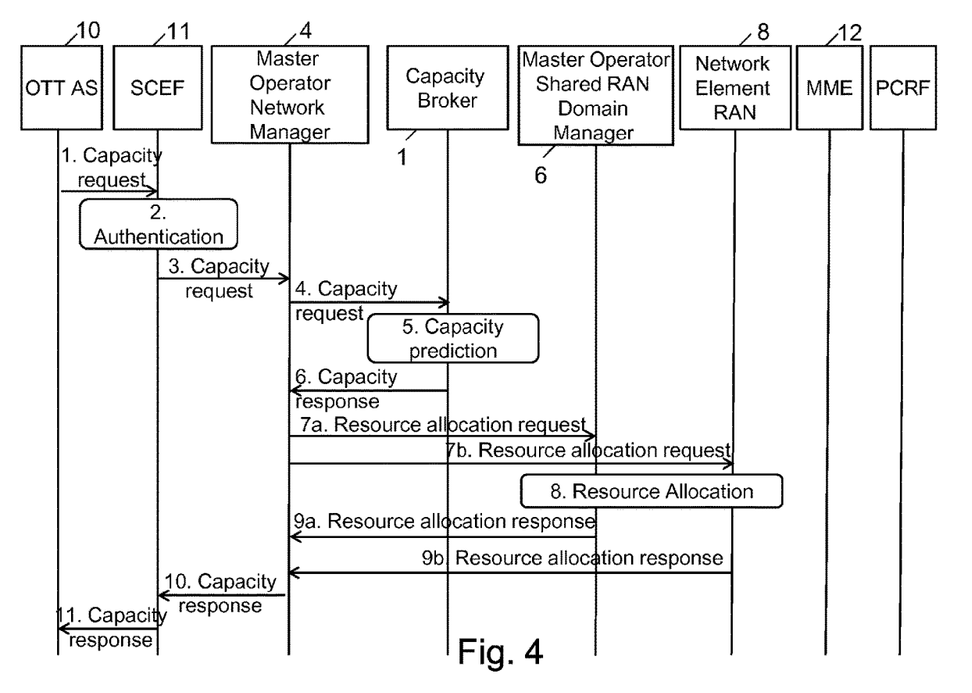
FIG. 4 is a flow diagram illustrating resource allocation and policy provision upon incoming resource requests from an OTT application server in accordance with an embodiment of the present invention.

FIG. 4 shows a call flow according to an alternative embodiment of the invention. Specifically, FIG. 4 illustrates the steps for allocating capacity or resource, once a new capacity or resource request from an OTT application or service provider 10 is received at the SCEF 11, as shown in step 1. The SCEF 11, as shown in step 2, provides the corresponding authentication and authorization procedures. Once this process is successful, the capacity or resource request is forwarded through the master operator network manager 4 to the capacity or resource broker 1 in step 3 and step 4, respectively. The capacity or resource broker 1, in step 5, checks the sharing configuration and allocates capacity if that is possible, returning back to the master operator network manager 4, in step 6, the required resource allocation or virtual slice and, depending on the specific configuration, specifics regarding, e.g., the starting time and duration, probability/confidence degree of resource utilization and the SLAs and the corresponding policies for the core network. The master operator network manager 4 then forwards via the Inf-N 14 such configurations towards the corresponding master operator shared RAN domain manager 6 or network element RAN 8 in step 7a and step 7b, respectively, which allocate the corresponding resources in step 8 and provide back a resource allocation response in step 9a and step 9b, respectively.

The master operator network manager 4 finally contacts the OTT application provider 10 via the SCEF 11, indicating in the capacity or resource response, in case the request was successful, its time duration and/or regularity, the probability/confidence degree of resource utilization, etc. in step 10 and step 11. If, following step 4, the master operator network manager 4 receives a negative capacity or resource response from the capacity or resource broker 1, it can immediately skip all remaining configuration steps and get to step 10 and step 11, creating a capacity or resource response that can suggest, e.g., an SLA modification or reduction of the required time duration or starting time or reduce the number of cells that are available for accommodating the request. Based-on such a feedback the OTT application provider 10 can then issue a new modified request or can simply terminate the capacity or resource request process towards that particular infrastructure provider. When the master-operator network manager 4 receives the resource allocation response from the RAN, i.e. either from the master operator shared RAN domain manager 6 or from a network element 8 of the shared RAN 3, it can then use the Inf-N 14 to coordinate the decisions of the capacity broker 1 with the PCRF (not shown in FIGS. 1 and 2) in order to enforce policies in the EPS regarding particular OTT applications.

Figure 5:
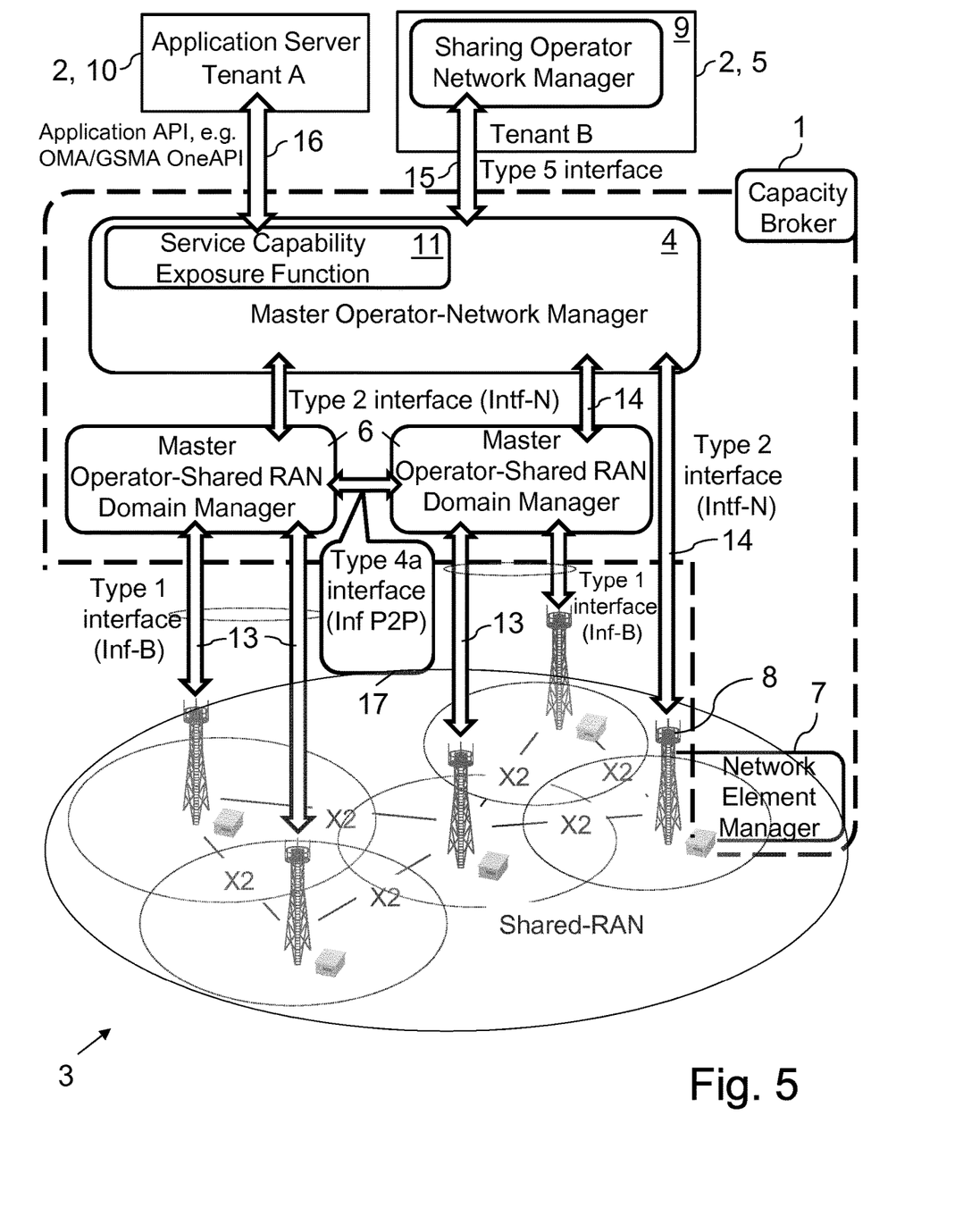
FIG. 5 is a schematic view illustrating a network management architecture accommodating a logical centralized version of the capacity broker in a MOCN scenario in accordance with an embodiment of the present invention.

FIG. 5 illustrates an embodiment of the present invention where the network management architecture accommodates a logical centralized version of the capacity or resource broker 1. While the illustrated embodiment considers a MOCN scenario, it should be noted that an implementation of a logically centralized capacity broker 1 is also possible in connection with different scenarios, in particular in connection with GWCN scenarios. Generally, the capacity or resource broker 1 can be a logically centralized network function that is composed by functions that reside on the master operator network manager 4, e.g. monitoring for creating the global network view and/or executing the capacity forecasting/allocation algorithm, etc., on the master operator shared RAN domain manager 6 and/or on a master operator shared eNB network element manager 7, e.g. creating a local network view to be combined with local network views of other network elements for composing a global one and/or executing a capacity forecasting/allocation algorithm, etc., on the PCRF (not shown in FIG. 5), e.g. facilitating a dynamic policing, and, for the GWCN case, on the MME (Mobility Management Entity, not shown in FIG. 5), e.g. enabling a dynamic handover policy. The OSS/BSS can still provide the network planning/topology and facilitate manual changes and updates. An overview of a simple logical global capacity or resource broker architecture, in where the capacity or resource broker 1 is composed by the master operator network manager 4, a set of master operator shared RAN domain managers 6 and network element managers 7 is shown in FIG. 5.

In this case, once a capacity or resource request is received at the master operator network manager 4, it is forwarded towards the corresponding master operator-shared RAN domain manager 6 or network element managers 7 that in turn retrieve the required information to create the global view from selected other master operator shared RAN domain managers 6 or other network element managers 7.

To accomplish this, according to these embodiments information exchange/transfer enhancements on the type 4 interface Inf P2P 17 are introduced, including, but not limited, the exchange of OTT application or OTT session id or service provider id or PLMN id, list of cells (if the information exchange is between master operator shared RAN domain managers 6) or per cell (if the information exchange involves network element managers 7), the resource allocation (e.g. resource blocks and/or throughput) and/or the type of request (e.g., periodic, on-demand), the resource type, the time duration, QoS (e.g. radio bearer types) and update information about offloading policies. In addition, the type 4 interface Inf P2P 17 exchange/transfer enhancements may also reflect mobility per cell or set of cells considering stationary users and an average mobility speed of the users (e.g., with the grading low, medium, high).

In these embodiments the master operator network manager 4 can forward the capacity or resource request towards the PCRFs (not shown in FIG. 5), and then these elements can coordinate with the corresponding master operator shared RAN domain manager 6 or network element managers 7 via the master operator network manager 4 through the Inf-N interface 14.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 resource/capacity broker
 2 tenant
 3 mobile network/shared RAN
 4 master operator network manager
 5 mobile virtual network operator, MVNO
 6 master operator shared RAN domain manager
 7 network element manager
 8 shared eNB
 9 sharing operator network manager
 10 application server of OTT provider
 11 Service Capability Exposure Function, SCEF
 12 Mobility Management Entity, MME
 13 interface Inf-B
 14 interface Inf-N
 15 Type 5 interface
 16 Application API
 17 Type 4 interface Inf P2P

The invention claimed is:

1. A network management system for a shared Radio Access Network (RAN) infrastructure provided by a mobile network operator, comprising:
 a master operator network manager of the mobile network operator for managing the shared RAN infrastructure;
 one or more tenants configured to direct resource requests requesting resource allocations of RAN capacity of the shared RAN infrastructure to the master operator network manager and configured to receive resource allocations from the master operator network manager; and
 a capacity or resource broker configured to provide signaling-based admission control for the one or more tenants and to decide on the resource allocations of the RAN capacity to the one or more tenants, wherein the capacity or resource broker resides inside the network of the mobile network operator.

2. The system according to claim 1, wherein the capacity or resource broker is placed at or is implemented as part of the master operator network manager.

3. The system according to claim 1, wherein the capacity or resource broker is implemented as a logically centralized network function that is composed by functions that reside on the master operator network manager, on a master operator shared RAN domain manager, on shared network elements of the shared RAN infrastructure, on a Policy and Charging Rules Function (PCRF) and/or on a Mobility Management Entity (MME).

4. The system according to claim 1, wherein the master operator network manager employs an Integration Reference Point (IRP) manager that is configured to monitor and control shared network elements of the shared RAN infrastructure via an IRP agent that resides in a master operator shared RAN domain manager or network element managers of the shared network elements.

5. The system according to claim 1, wherein the master operator network manager is configured to enable sharing operator network managers of the one or more tenants to monitor and control the respective allocated resources.

6. The system according to claim 1, wherein the capacity or resource broker is configured to use network monitoring information that is collected at the master operator network manager for taking resource allocation decisions satisfying service level agreement (SLA) requirements.

7. The system according to claim 1, wherein the one or more tenants are configured to direct resource requests on-demand to the master operator network manager, and wherein the one or more tenants include a mobile virtual network operator comprising a sharing operator network manager that is configured to receive resource allocations from the master operator network manager on demand.

8. The system according to claim 1, wherein the one or more tenants include application providers.

9. The system according to claim 8, wherein a Service Capability Exposure Function that is placed at the master operator network manager is configured to use the capacity or resource broker for capacity and/or service level agreement (SLA) allocations to the application providers.

10. The system according to claim 9, wherein the resource requests contain at least one of an over the top (OTT) application id, a service provider id, an OTT session id, a Public Land Mobile Network (PLMN) id, a specification of the requested resources, a type of the request, and a time duration.

11. The system according to claim 9, wherein the resource requests contain mobility related information, parameters for assisting traffic patterns predictability, and/or connection properties.

12. The system according to claim 1, wherein an existing 3GPP Int-N interface between the master operator network manager and master operator shared RAN domain managers, the existing 3GPP Int-B interface between the master operator shared RAN domain managers and network elements of the shared RAN infrastructure, and/or an existing 3GPP Type 5 interface between the master operator network manager and sharing operator network managers of the one or more tenants are extended to accommodate information contained in the resource requests.

13. The system according to claim 12, wherein the Int-N interface between the master operator network manager and the master operator shared RAN domain managers and/or an Int-B interface between the master operator shared RAN domain managers and network elements of the shared RAN infrastructure and/or the Type 5 interface between the master operator network manager and the sharing operator network managers of the one or more tenants are configured to accommodate information regarding an over the top (OTT) application, information regarding an OTT session id, information regarding a service provider id, information regarding a Public Land Mobile Network (PLMN) id, information on respective cells that are affected by a resource request, information on the resource allocation, on information regarding a type of request, information regarding a resource type, information regarding a time duration, information regarding a quality of service (QoS) and/or update information about offloading policies.

14. The system according to claim 1, wherein an application API between an application provider and a Service Capability Exposure Function at the master operator network manager is configured to accommodate information regarding an over the top (OTT) id, information regarding an OTT session id, information regarding a list of cells, information on the resource allocation, information on a type of request, information on a resource type, and/or information on a time duration.

15. A method of performing network management for a shared Radio Access Network (RAN) infrastructure provided by a mobile network operator, the method comprising:
managing the shared RAN infrastructure by a master operator network manager of the mobile network operator,
receiving, by the master operator network manager resource, requests from one or more tenants requesting resource allocations of RAN capacity of the shared RAN infrastructure;
sending, to the one or more tenants, resource allocations from the master operator network manager, and
providing signaling-based admission control for the one or more tenants and deciding on the resource allocations of the RAN capacity to the one or more tenants by a capacity or resource broker that resides inside the network of the mobile network operator.

16. The method according to claim 15, wherein the capacity or resource broker is configured to use network monitoring information that is collected at the master operator network manager for making resource allocation decisions satisfying a service level agreement (SLA).

17. The method according to claim 15, wherein the one or more tenants are configured to direct resource requests on-demand to the master operator network manager, and wherein the one or more tenants include a mobile virtual network operator comprising a sharing operator network manager that is configured to receive resource allocations from the master operator network manager on demand.

18. The method according to claim 15, wherein the one or more tenants include application providers.

19. The method according to claim 18, wherein a Service Capability Exposure Function that is placed at the master operator network manager is configured to use the capacity or resource broker for capacity and/or service level agreement (SLA) allocations to the application providers.

20. A network management system for a shared Radio Access Network (RAN) infrastructure provided by a mobile network operator, comprising:
a master operator network manager of the mobile network operator for managing the shared RAN infrastructure;
the master operator network manager configured to receive, from one or more tenants, resource requests requesting resource allocations of RAN capacity of the shared RAN infrastructure, and configured to send resource allocations of the RAN capacity to the one or more tenants; and
a capacity or resource broker configured to provide signaling-based admission control for the one or more tenants and to decide on the resource allocations of the RAN capacity to the one or more tenants, wherein the capacity or resource broker resides inside the network of the mobile network operator.

* * * * *